(12) United States Patent
Nakaminami (10) Patent No.: US 9,557,727 B2
(45) Date of Patent: Jan. 31, 2017

(54) PROGRAM CREATION DEVICE AND PROGRAMMABLE LOGIC CONTROLLER

(75) Inventor: Kazuhiro Nakaminami, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 502 days.

(21) Appl. No.: 14/117,535

(22) PCT Filed: Aug. 3, 2011

(86) PCT No.: PCT/JP2011/067804
§ 371 (c)(1),
(2), (4) Date: Nov. 13, 2013

(87) PCT Pub. No.: WO2013/018219
PCT Pub. Date: Feb. 7, 2013

(65) Prior Publication Data
US 2014/0228984 A1  Aug. 14, 2014

(51) Int. Cl.
*G05B 19/05* (2006.01)

(52) U.S. Cl.
CPC ... *G05B 19/056* (2013.01); *G05B 2219/13172* (2013.01)

(58) Field of Classification Search
CPC .......................................... G05B 2219/13172
USPC .......................................................... 700/87
See application file for complete search history.

(56) References Cited

U.S. PATENT DOCUMENTS

| | | |
|---|---|---|
| 6,505,341 B1 | 1/2003 | Harris et al. |
| 7,694,220 B2 | 4/2010 | Kawano |
| 2002/0029218 A1 | 3/2002 | Bentley et al. |
| 2003/0061349 A1* | 3/2003 | Lo .......................... H04L 29/06 709/225 |
| 2007/0283321 A1* | 12/2007 | Hegde ...................... G06F 8/71 717/110 |
| 2009/0327294 A1 | 12/2009 | Bailor et al. |

FOREIGN PATENT DOCUMENTS

| | | |
|---|---|---|
| JP | 4-293123 A | 10/1992 |
| JP | 06-12310 A | 1/1994 |

(Continued)

OTHER PUBLICATIONS

Communication dated Nov. 27, 2014, issued by the Korean Intellectual Property Office in counterpart Application No. 10-2013-7034151.

(Continued)

*Primary Examiner* — Mohammad Ali
*Assistant Examiner* — Emilio J Saavedra
(74) *Attorney, Agent, or Firm* — Sughrue Mion, PLLC; Richard C. Turner (57) ABSTRACT

An engineering tool is used for editing data of program components of programmable logic controllers which form a programmable logic controller system which enables a plurality of users to simultaneously edit the program components, and for writing the edited data of the program components to the programmable logic controllers. The engineering tool includes a program component editing method setting unit configured to set the timing at which the data of the program components changed by the editing is transmitted to other engineering tools in which the data of the program components is being edited, for each of the program components.

2 Claims, 4 Drawing Sheets

(56) References Cited

FOREIGN PATENT DOCUMENTS

| | | | |
|---|---|---|---|
| JP | 8-202415 | A | 8/1996 |
| JP | 10-011115 | A | 1/1998 |
| JP | 1127294 | A | 1/1999 |
| JP | 11-085487 | A | 3/1999 |
| JP | 11306173 | A | 11/1999 |
| JP | 2000-322111 | A | 11/2000 |
| JP | 2005-084733 | A | 3/2005 |
| JP | 2005-301838 | A | 10/2005 |
| JP | 2006-277435 | A | 10/2006 |
| JP | 2008-210192 | A | 9/2008 |
| JP | 2009-140443 | A | 6/2009 |
| WO | 2009/158108 | A2 | 12/2009 |

OTHER PUBLICATIONS

Taiwanese Office Action, mailed Jan. 13, 2014, Application No. 100138449.
Japanese Office Action, mailed Apr. 30, 2014, Application No. 2013-526698.
Communication dated Jan. 25, 2016, issued by the German Patent and Trademark Office in counterpart German Application No. 112011105475.0.

* cited by examiner

PROGRAM CREATION DEVICE AND PROGRAMMABLE LOGIC CONTROLLER

CROSS REFERENCE TO RELATED APPLICATIONS

This application is a National Stage of International Application No. PCT/JP2011/067804 filed Aug. 3, 2011, the contents of all of which are incorporated herein by reference in their entirety.

FIELD

The present invention relates to a program simultaneous editing method, in a case where a plurality of users simultaneously edit program components with respect to a certain programmable logic controller in a programmable logic controller system.

BACKGROUND

In a case where a plurality of users simultaneously edit program components with respect to a certain programmable logic controller in a programmable logic controller system, by adding lock information indicating possibility of making edition for each of the program components stored in the programmable logic controller, the possibility of edition for each of the program components can be monitored, and the users can simultaneously edit data. (Refer to Patent Literature 1.)

Also, in a case where a plurality of users are concurrently connected to a certain target device, when a certain client device registers shared data, the registered content can be immediately reflected to client devices other than the client device that has registered the data therein. (Refer to Patent Literature 2.)

CITATION LIST

Patent Literature

Patent Literature 1: Japanese Patent Application Publication No. 2005-84733
Patent Literature 2: Japanese Patent Application Publication No. 2008-210192

SUMMARY

Technical Problem

A programmable logic controller system is configured by a plurality of control devices, such as a programmable logic controller, a communication control unit, and a data conversion unit, as constituent devices. Also, there are various types of data stored in a certain programmable logic controller including, apart from program components, data related to the program components, such as device memory allocation information, communication setting information of the communication control unit, and setting information to be used in the data conversion unit. In the following explanation, the data such as device memory allocation information and communication setting information of the communication control unit will also be hereinafter called as "program components".

In a case where the method in which the lock information indicating the possibility of edition for each of the program components stored in the programmable logic controller is added to enable a plurality of users to simultaneously perform edition is used, control of the possibility of edition using the lock information is performed also on the program components such as device memory allocation information, communication setting information of the communication control unit, and setting information to be used in the data conversion unit.

In a case where the control of possibility of edition using the lock information is performed on the program components such as device memory allocation information and communication setting information of the communication control unit, other users cannot perform editing while a certain user is performing the same. As a result, the other users can grasp the changed contents only after the user editing the same has finished writing on the programmable logic controller, even though there is a great possibility that they themselves are related to the program they are editing, which in turn causes them to rework from the beginning (or redoing of work) and hence leads to the problem of deterioration of working efficiency.

Further, the programmable logic controller system often includes a plurality of control devices. In conventional technology, one programmable logic controller cannot centrally manage the possibility of edition on the program components of all control devices. In that case, possibility of edition on the program components can be controlled only for each programmable logic controller unit, which in turn leads to the problem of deteriorating impairing the working efficiency, such as requiring a user to set up again the reconnection for each of the control devices.

Also, at the time of starting edition rather than after the completion of the edition, each individual user desires to know beforehand that changes may be made to the program components such as the device memory allocation information and the communication setting information of the communication control unit. However, the user grasps changed contents only after the completion of the edition of the program components, which in turn causes reworks due to the changes made in the program components and hence leads to the problem of deterioration of the working efficiency.

The present invention has been made in view of the above-mentioned circumstances, and it is an object of the present invention to achieve a program creation device and a programmable logic controller capable of suppressing rework and thus improving working efficiency, when a plurality of editors simultaneously edit program components.

Solution to Problem

In order to solve the aforementioned problems, a program creation device according to one aspect of the present invention, which is used for editing data of program components of programmable logic controllers forming a programmable logic controller system which enables a plurality of users to simultaneously edit the program components, and for writing the edited data of the program components to the programmable logic controllers, is configured to include a program component editing method setting unit configured to set the timing at which the data of the program components changed by the editing is transmitted to other program creation devices in which the data of the program components is being edited, for each of the program components.

Advantageous Effects of Invention

A program creation device according to the present invention can set the timing for transmitting data of the program components changed by an edition is transmitted to other program creation devices in which the data of the program components is being edited for each of the program components. Therefore, the program creation device performs fine control on simultaneous editing operations according to the type or property of data, thereby achieving the effect of suppressing reworks in designing of a programmable logic controller system.

DESCRIPTION OF EMBODIMENTS

An embodiment of a program creation device and a programmable logic controller according to the present invention will be described in detail below with reference to the drawings. It is to be understood that the present invention is not limited by this embodiment.

Embodiment

Figure 1:
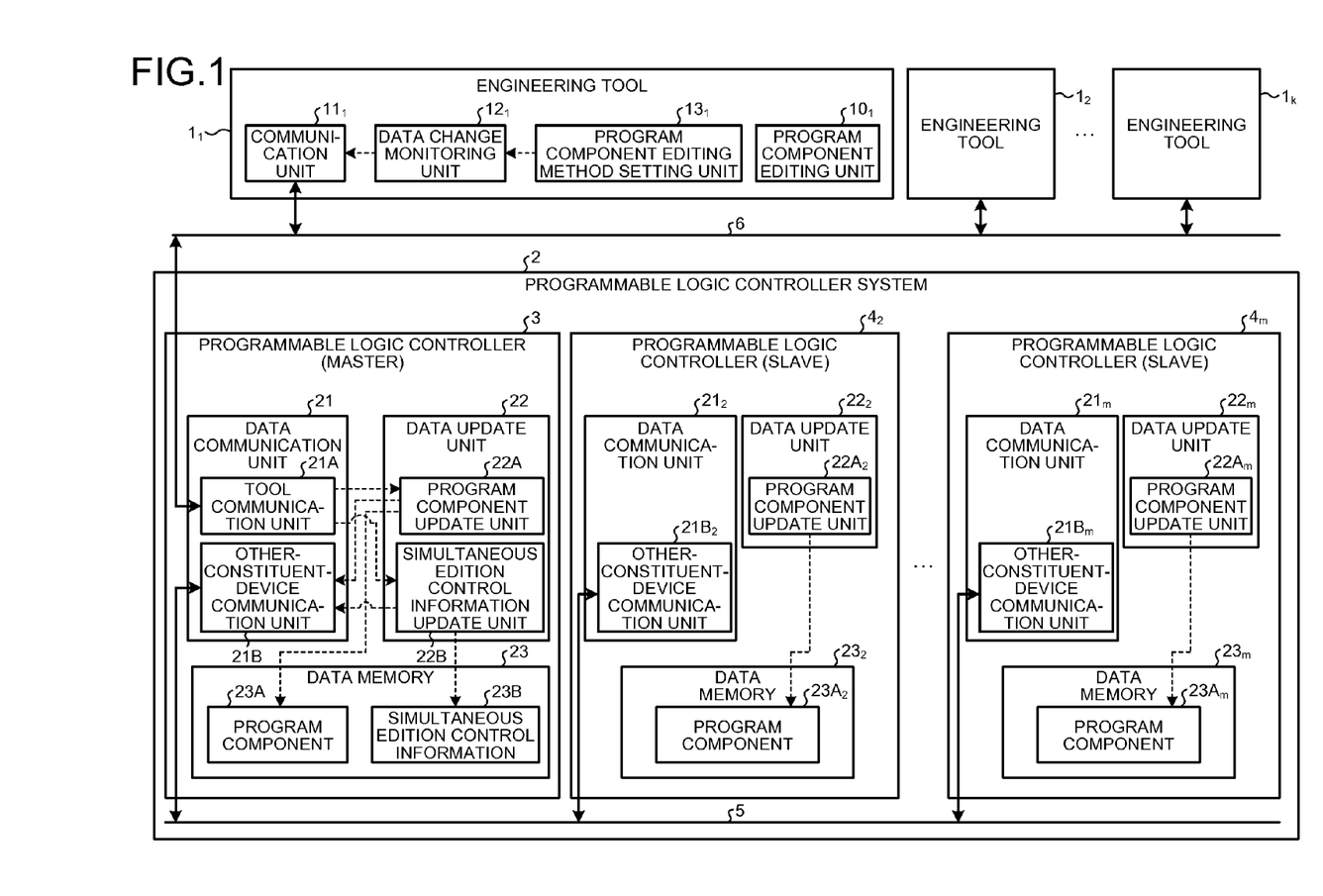
FIG. 1 is a diagram illustrating a configuration of an embodiment of a program creation device and a programmable logic controller according to the present invention.

FIG. 1 is a diagram illustrating a configuration of the embodiment of the program creation device and the programmable logic controller according to the present invention. A programmable logic controller system 2 according to the embodiment and engineering tools $1_1$ to $1_k$ as the program creation devices (where k denotes a natural number equal to or more than 2) are connected to each other through a communication medium 6 such as a network.

The programmable logic controller system 2 includes one programmable logic controller 3 as a master (hereinafter may be referred to just as a "master programmable logic controller"), and (m−1) programmable logic controllers 4 as slaves (where m denotes a natural number equal to or more than 2, and hereinafter may be referred to just as "slave programmable logic controllers"), and the programmable logic controllers 3 and 4 are connected through a data bus 5. Incidentally, the slave programmable logic controllers $4_2$ to $4_m$ are not essential components for the programmable logic controller system 2. In other words, the programmable logic controller system 2 may also be configured without including the programmable logic controllers $4_2$ to $4_m$ as the slaves.

The programmable logic controller 3 as the master includes a data communication unit 21, a data update unit 22 and a data memory 23.

The data communication unit 21 includes a tool communication unit 21A and an other-constituent-device communication unit 21B. The tool communication unit 21A transmits a program component 23A stored in the data memory 23, and program components $23A_2$ to $23A_m$ acquired from the slave programmable logic controllers $4_2$ to $4_m$ through the other-constituent-device communication unit 21B, to the engineering tools $1_1$ to $1_k$ as request sources, in response to requests from the engineering tools $1_1$ to $1_k$. Also, the tool communication unit 21A receives edited data (or changed contents) of the program components 23A, $23A_2$ to $23A_m$, and simultaneous edition control information 23B, from the engineering tools $1_1$ to $1_k$. The data update unit 22 includes a program component update unit 22A and a simultaneous edition control information update unit 22B. The data memory 23 is a storage element such as a nonvolatile memory, and retains two types of information, namely, the program component 23A and the simultaneous edition control information 23B. The simultaneous edition control information 23B will be described in detail later.

The engineering tool $1_w$ (where w denotes a natural number which lies between 1 and k inclusive (1≤w≤k)) includes a communication unit $11_w$, a data change monitoring unit $12_w$, a program component editing method setting unit $13_w$ and a program component editing unit $10_w$. Here, the engineering tools $1_2$ to $1_k$, although illustration of their internal configuration is omitted, have the same configuration as the engineering tool $1_1$.

The communication unit $11_w$ carries out data communication with the tool communication unit 21A of the programmable logic controller 3. Data to be transmitted and received by the communication is the changed content of the program components and of the simultaneous edition control information (lock or unlock) of the master programmable logic controller 3 and the slave programmable logic controllers $4_2$ to $4_m$.

The data change monitoring unit $12_w$ monitors user's operation on the program component editing unit $10_w$ and data changes, and notifies the master programmable logic controller 3 and the other engineering tools $1_1$ to $1_k$ of the operation performed by the user and the changes made in data via the communication unit $11_w$ as needed. Operation of the data change monitoring unit $12_w$ will be described in detail later.

The program component editing unit $10_w$ is a functional unit as a tool for actually performing editing operation of data of the program components of the devices of the programmable logic controller system 2. In other words, the program component editing unit $10_w$ allows the user to perform edition of the program components 23A, $23A_2$ to $23A_m$ acquired from the master programmable logic controller 3 by the communication unit $11_w$. When editing the program components 23A, $23A_2$ to $23A_m$, the program component editing unit $10_w$ performs lock-based control on simultaneous edition in accordance with the simultaneous edition control information 23B acquired from the programmable logic controller 3; however, known technology is applicable to this control, and therefore, explanation of the control will be omitted. Data of the program components 23A, $23A_2$ to $23A_m$ edited by the program component editing unit $10_w$ is transmitted to the master programmable logic controller 3 through the communication unit $11_w$.

Figure 2A:
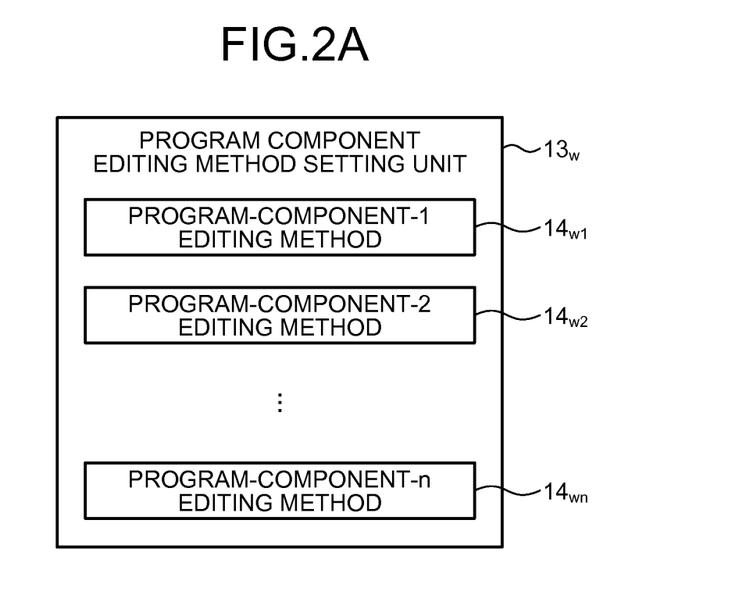
FIG. 2A is a diagram illustrating a configuration of the program component editing method setting unit.
Figure 2B:
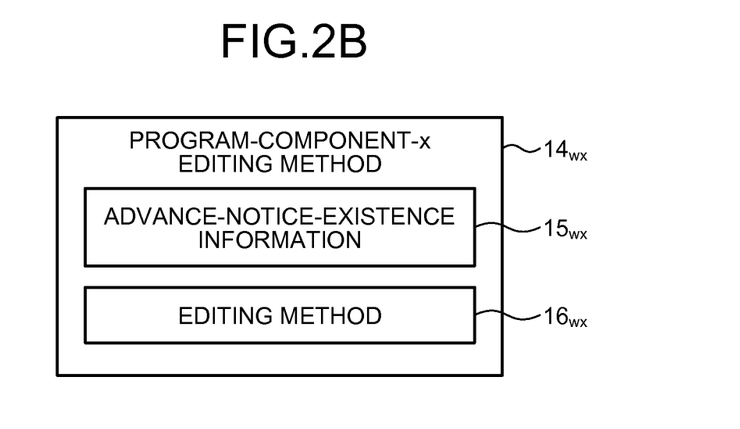
FIG. 2B is a diagram illustrating a configuration of the program component editing method.

FIG. 2A is a diagram illustrating a configuration of the program component editing method setting unit $13_w$. As illustrated in FIG. 2A, the program component editing method setting unit $13_w$ is configured by including a program-component-1 editing method $14_{w1}$ to a program-component-n editing method $14_{wn}$ for program components 1 to n, respectively (where n denotes a natural number equal to or more than 2). FIG. 2B is a diagram illustrating a configuration of the program-component-x editing method $14_{wx}$ (where x denotes a natural number which lies between 1 and n inclusive (1≤x≤n)). As illustrated in FIG. 2B, the program-component-x editing method $14_{wx}$ is formed of two types of information, namely, advance-notice-existence information $15_{wx}$ and information of editing method $16_{wx}$.

The advance-notice-existence information $15_{wx}$ is information as to whether to notify another user of the fact that a user is going to change the program component x, when the user is going to do so. The provision of the advance-notice-existence information $15_{wx}$ makes it possible to grasp in advance that contents may be changed in a case where a plurality of users simultaneously edit the program components of the programmable logic controller system 2, and thus possible reworks may be suppressed during the user's programming time.

Further, the editing method $16_{wx}$ is information which is set for each of the program components 1 to n, and is information as to which of the methods given below, namely, a lock-based simultaneous edition control method and a method in which after the completion of data input operation the date is reflected on the editing screen of a plurality of users, should be applied at the time of editing the program component x.

By making it possible to set two different methods for each of the program components, a flexible selection between those methods can be performed according to the type or property of data, so that suppression of reworks is enabled and working efficiency in designing of the programmable logic controller system 2 is improved.

Changed contents transmitted from the communication unit $11_w$ to the tool communication unit 21A are transmitted from the program component update unit 22A and the simultaneous edition control information update unit 22B via the other-constituent-device communication unit 21B to other programmable logic controllers. Due to this, the master programmable logic controller 3 can centrally receive the changed contents of the program components and the simultaneous edition control information of all programmable logic controllers present in the programmable logic controller system 2, and perform processing for transmission to other constituent devices. In short, one single programmable logic controller 3 centrally manages simultaneous edition control on the a plurality of programmable logic controllers 3, $4_2$ to $4_m$ in the programmable logic controller system 2, and thereby, control of simultaneous edition by a plurality of users is made possible with a single path, which thus enables improving the working efficiency in designing the programmable logic controller system 2, such as eliminating a need for cable reconnection.

The program component update unit 22A has a function of causing the changed contents of the program components received by the tool communication unit 21A to be reflected. To change the program components in its own programmable logic controller 3, the changed contents are reflected in the program component 23A. To change the program components of other programmable logic controllers (i.e. the programmable logic controllers $4_2$ to $4_m$), the changed contents are transmitted to the other-constituent-device communication unit 21B.

The simultaneous edition control information update unit 22B has a function of causing the changed contents of the simultaneous edition control information received by the tool communication unit 21A to be reflected. The simultaneous edition control information update unit 22B causes the changed contents of the simultaneous edition control information regarding all devices belonging to the programmable logic controller system 2 to be reflected in the simultaneous edition control information 23B.

Figure 3A:
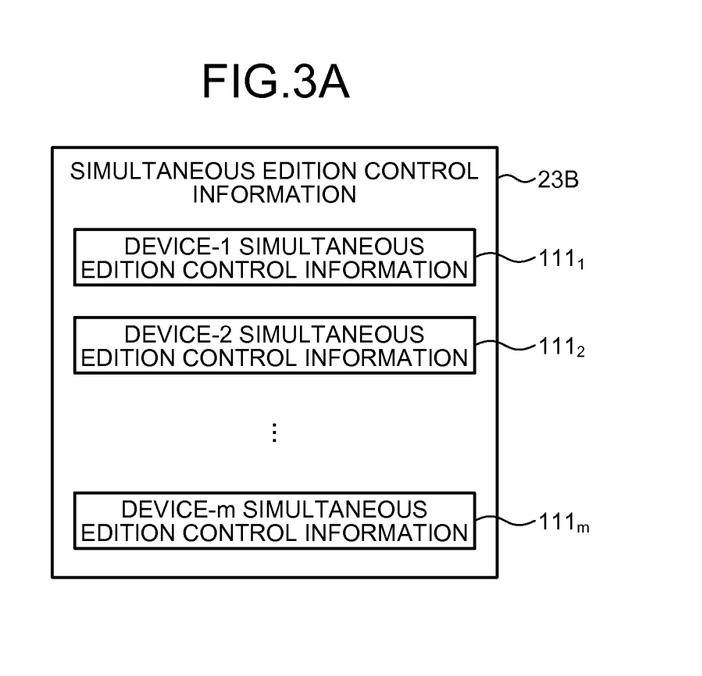
FIG. 3A is a diagram illustrating a configuration of simultaneous edition control information.
Figure 3B:
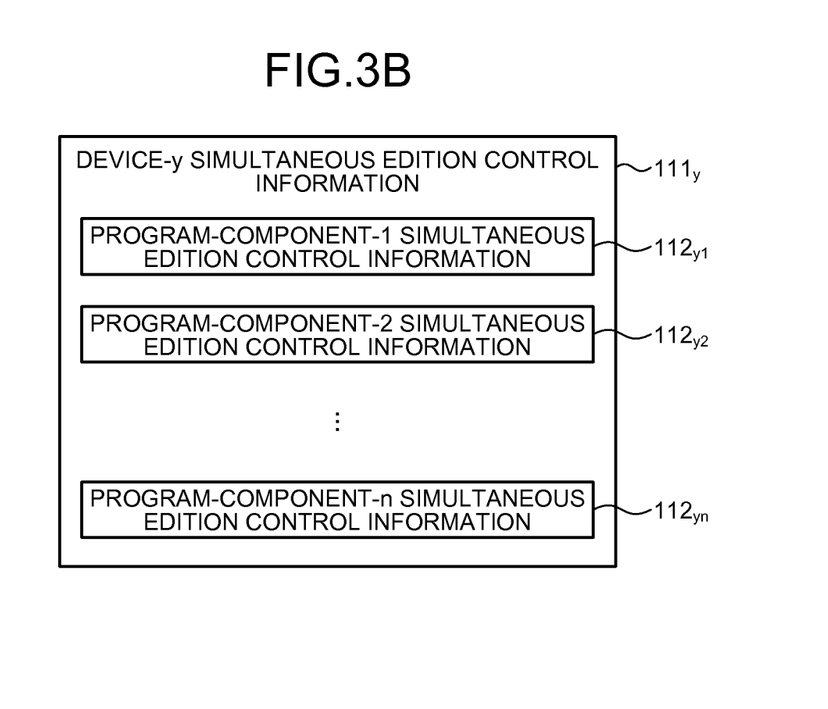
FIG. 3B is a diagram illustrating a configuration of the simultaneous edition control information on each device.

FIG. 3A is a diagram illustrating a configuration of the simultaneous edition control information 23B. The simultaneous edition control information 23B retains the simultaneous edition control information regarding all devices belonging to the programmable logic controller system 2. As illustrated in FIG. 3A, the simultaneous edition control information 23B is formed of device-1 simultaneous edition control information $111_1$ to device-m simultaneous edition control information $111_m$ for a plurality of devices, respectively. Here, the device-1 simultaneous edition control information $111_1$ is information regarding the master programmable logic controller 3, and each of the device-2 simultaneous edition control information $111_2$ to the device-m simultaneous edition control information $111_m$ is information regarding the slave programmable logic controllers $4_2$ to $4_m$, respectively. FIG. 3B is a diagram illustrating a configuration of the simultaneous edition control information regarding each device. As illustrated in FIG. 3B, the device-y simultaneous edition control information $111_y$ for a device y (where y denotes a natural number which lies between 1 and m inclusive (1≤y≤m)) is formed of program-component-1 simultaneous edition control information $112_{y1}$ to program-component-n simultaneous edition control information $112_{yn}$ for the a plurality of program components 1 to n, respectively. The program-component-x simultaneous edition control information $112_{yx}$ is information indicating whether or not the program component x is locked.

Description will be given with regard to the slave programmable logic controller $4_z$ (where z denotes a natural number which lies between 2 and m inclusive (2≤z≤m)). The slave programmable logic controller $4_z$ includes a data communication unit $21_z$, a data update unit $22_z$, and a data memory $23_z$, in the same manner as the master programmable logic controller 3. The data communication unit $21_z$ includes an other-constituent-device communication unit $21B_z$. Also, the data update unit $22_z$ includes a program component update unit $22A_z$. Further, the data memory $23_z$ includes a program component $23A_z$.

The other-constituent-device communication unit 21B, receives the changed contents of the program components from the master programmable logic controller 3. The program component update unit $22A_z$ reflects the received program changes in the program component $23A_z$.

Figure 4:
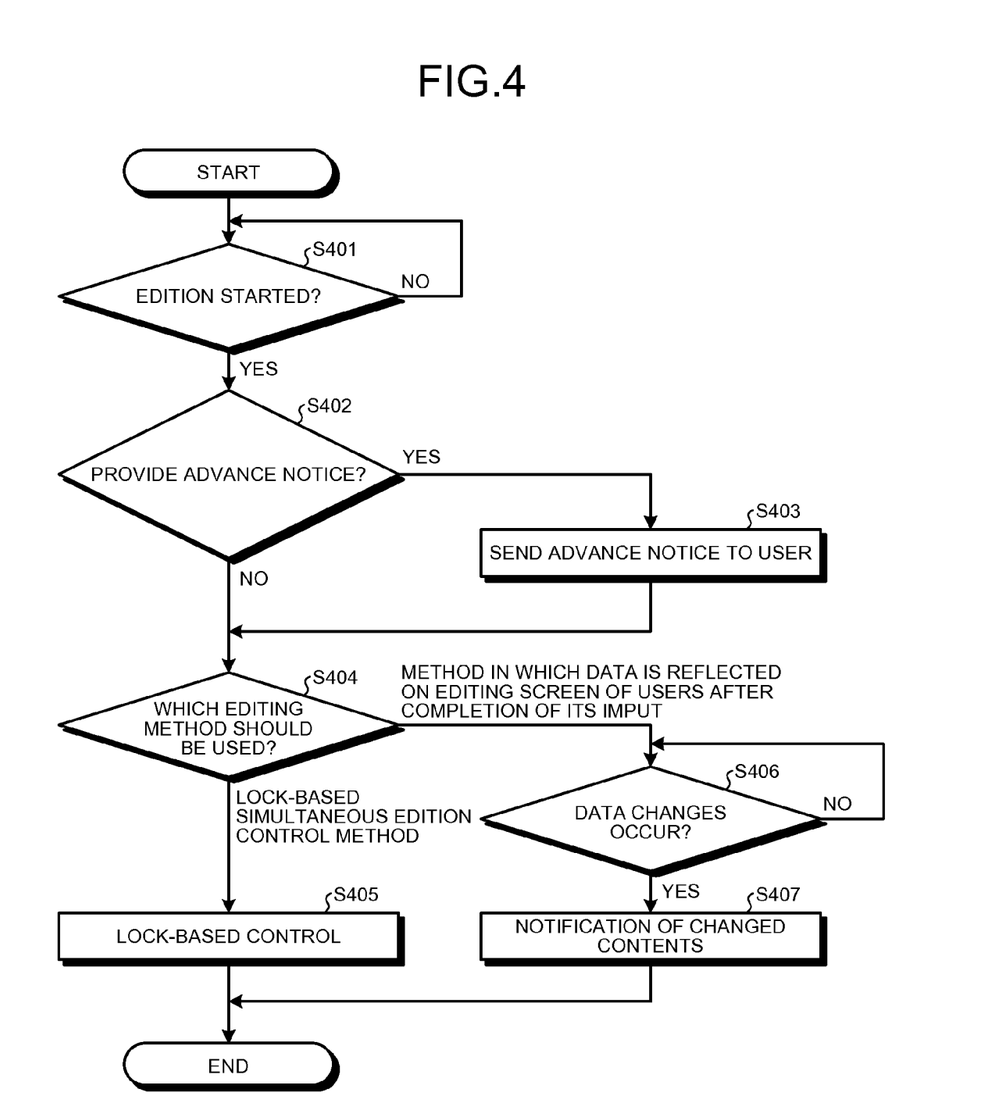
FIG. 4 is a flowchart illustrating a flow of processing by a data change monitoring unit.

Detailed description will be given with reference to FIG. 4 as to how the data change monitoring unit $12_w$ performs processing. FIG. 4 is a flowchart illustrating a flow of the processing by the data change monitoring unit $12_w$. The data change monitoring unit $12_w$ performs constant monitoring to see whether a user has started a certain program component editing (step S401). Decision is made as to whether an advance notification of the start of edition of the program component should be provided at the time of starting the edition of the program component (step S402). Specifically, an attribute indicating whether the advance notification should be provided (i.e. advance-notice-existence information $15_{wx}$) is added to each of the program components, and thus, whether to provide the advance notification is determined based on the information. In a case where the advance notification is provided ("Yes" at step S402), the communication unit $11_w$ is requested to send the advance notification to other users (step S403). The content of the notification which is given to other users is information for identifying the user who has started the edition and the engineering tool $1_w$ (e.g. a user name, a terminal ID of the engineering tool $1_w$, and the like), and a program component name (e.g. a data name) as an editing target.

Using the editing method $16_{wx}$ provided to each of the program components, a decision is made as to which of the following methods, namely, the lock-based simultaneous edition control method and the method in which data is reflected on the editing screen of a plurality of users after the completion of its input operation, is to be applied for the program component which is edited by a user (step S404). In the case of the lock-based simultaneous edition control method ("Lock-Based Simultaneous Edition Control method" at step S404), the changed contents of the simultaneous edition control information (i.e. a lock on the program component) are transmitted to the master programmable logic controller 3, and the lock-based simultaneous edition control is performed based on the simultaneous edition control information 23B stored in the data memory 23 (step S405). Since the lock-based control method in step S405 is conventional technology, description of this method will be omitted. In the case of the method in which after the completion of data input operation the date is reflected on the editing screen of a plurality of users ("Method in which date is reflected on the editing screen of a plurality of users after the completion of data input operation" at step S404), data change is constantly monitored (step S406), and, if a data change occurs ("Yes" at step S406), the content of the change is notified to other users (step S407).

According to the present embodiment, in a case where a plurality of users simultaneously edit the program components of the programmable logic controller system 2, it is possible to grasp in advance that the program components may be changed, thereby enabling suppression of reworks in designing the programmable logic controller system 2, leading thus to an improvement in the working efficiency in designing the programmable logic controller system.

Also, according to the present embodiment, fine control of simultaneous edition is performed according to the type or property of data by a flexible combination of two different methods: namely, the lock-based simultaneous edition control method and the method in which data is reflected on the editing screen of a plurality of users after the completion of its input operation, thereby to enable suppressing the rework in the design of the programmable logic controller system and thus improving the working efficiency of the users.

Further, according to the present embodiment, one programmable logic controller centrally manages simultaneous edition of a plurality of programmable logic controllers in the programmable logic controller system, and thereby, simultaneous edition by a plurality of users can be controlled with a single path, which thus enables an improvement of the working efficiency in designing the programmable logic controller system, such as eliminating a need for cable reconnection.

Incidentally, in the above-mentioned embodiment, the engineering tool has been described by way of example as being capable of setting both the information as to whether or not an advance notification of the start of editing of the program component should be provided, and the timing at which another engineering tool is notified of data of the edited program component; however, only either one of these may be settable.

INDUSTRIAL APPLICABILITY

As described above, when a plurality of users simultaneously edit program components, the program creation device and the programmable logic controller according to the present invention are useful, because suppression of reworks may thereby be realized, and thus improving working efficiency.

REFERENCE SIGNS LIST $1_1$-$1_k$ engineering tools
2 programmable logic controller system
3 programmable logic controller (master)
$4_2$, $4_m$ programmable logic controllers (slaves)
5 data bus
6 communication medium
$10_1$ program component editing unit
$11_1$ communication unit
$12_1$ data change monitoring unit
$13_1$, $13_w$ program component editing method setting units
$14_{wx}$ program-component-x editing method
$15_{wx}$ advance-notice-existence information
$16_{wx}$ editing method
21 data communication unit
21A tool communication unit
21B other-constituent-device communication unit
22 data update unit
22A program component update unit
22B simultaneous edition control information update unit
23 data memory
23A program component
23B simultaneous edition control information
$111_y$ device-y simultaneous edition control information
$112_{yn}$ program-component-n simultaneous edition control information

The invention claimed is:

1. A program creation device which is used for editing data of program components of programmable logic controllers that form a programmable logic controller system which enables a plurality of users to simultaneously edit the program components, and writing the edited data of the program components to the programmable logic controllers, the program creation device comprising a program component editing method setter to set a timing for transmitting the data of the program components changed by the editing to other program creation devices in which the data of the program components is being edited, for each of the program components,
    wherein the program component editing method setter sets, in response to a first command, the timing for transmitting the changed data to a first timing at which the data of the program components is changed, and
    wherein the program component editing method setter sets, in response to a second command, the timing for transmitting the changed data to a second timing at which the changed data of the program components is written to the programmable logic controllers.

2. A master programmable logic controller which, in combination with slave programmable logic controllers, forms a programmable logic controller system which enables a plurality of program creation devices to simultaneously edit program components, and in which a plurality of program creation devices perform editing of each of the program components of the master programmable logic controller and the slave programmable logic controllers, the master programmable logic controller comprising:
    a data memory which stores data of the program components and simultaneous edition control information indicating whether or not the program components are being edited;
    a tool communicator to read out in response to a request from any one of the plurality of program creation devices, data of the program components and the simultaneous edition control information indicating whether or not the data of the program components are being edited, from the data memory, and to transmit, and receive data of the program components and the data changed by the editing of the data of the simultaneous edition control information, from the program creation device that is a request source;

a data updater to cause the data memory to store the data of the program components and the simultaneous edition control information received by the tool communicator; and an other-constituent-device communicator to transmit data of the program components of the slave programmable logic controllers and the simultaneous edition control information from the master programmable logic controller to the slave programmable logic controllers.

\* \* \* \* \*